(12) United States Patent  
Yamamoto

(10) Patent No.: US 6,581,742 B2
(45) Date of Patent: Jun. 24, 2003

(54) FLUID CLUTCH

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/972,906

(22) Filed: Oct. 10, 2001

(65) Prior Publication Data

US 2002/0050435 A1 May 2, 2002

(30) Foreign Application Priority Data

Oct. 30, 2000 (JP) ........................................ 2000-330208

(51) Int. Cl.⁷ ............................................... F16D 31/04
(52) U.S. Cl. ............................................................. 192/61
(58) Field of Search ............................................. 192/61

(56) References Cited

U.S. PATENT DOCUMENTS

| | | | | |
|---|---|---|---|---|
| 2,066,450 A | * | 1/1937 | Bascle et al. ................. | 192/61 |
| 2,371,227 A | * | 3/1945 | Dodge .......................... | 192/61 |
| 4,078,453 A | * | 3/1978 | Brace ........................... | 192/61 |
| 4,674,615 A | * | 6/1987 | Snyder ......................... | 192/61 |
| 4,981,201 A | * | 1/1991 | Hawkins ...................... | 192/58.2 |

FOREIGN PATENT DOCUMENTS

JP    63-140146 A  *  6/1988  .................. 475/99

* cited by examiner

*Primary Examiner*—Richard M. Lorence
(74) *Attorney, Agent, or Firm*—Antonelli, Terry, Stout & Kraus, LLP

(57) ABSTRACT

A fluid clutch disposed between a first shaft and a second shaft which are arranged on the same axis, includes a casing drive-coupled to the first shaft, a gear pump disposed in the casing and drive-coupled to the second shaft an intake passage formed in the casing and in the second shaft an communicating with an intake port of the gear pump, an exhaust passage formed in the casing and in the second shaft and communicating with an exhaust port of the gear pump, and a control valve disposed in the second shaft to control a communication area between the intake passage and the exhaust passage.

1 Claim, 3 Drawing Sheets ated on the same axis as the crank shaft. The transmission of torque is controlled by adjusting the pushing force exerted by the pressure plate.

FLUID CLUTCH

FIELD OF THE INVENTION

The present invention relates to a fluid clutch for transmitting rotational torque of an internal combustion engine.

DESCRIPTION OF THE PRIOR ART

A friction clutch, a fluid coupling and a torque converter have generally been used as clutches for transmitting the rotational torque of internal combustion engines.

The friction clutch comprises a flywheel mounted on a crank shaft of an engine, a pressure plate having a clutch facing disposed opposite the flywheel, and a clutch driven plate that is disposed between the flywheel and the pressure plate and is mounted on an input shaft of a transmission arranged on the same axis as the crank shaft. The transmission of torque is controlled by adjusting the pushing force exerted by the pressure plate.

The fluid coupling and torque converter comprise a casing coupled to a crank shaft (input shaft) of an engine, a pump that is disposed opposite casing and is mounted on the casing, a turbine that is disposed in a chamber formed by the pump and the casing so as to be opposite the pump and that is mounted on an output shaft arranged on the same axis as the crank shaft (input shaft), and an operation fluid filling a pump chamber. In the thus constituted fluid coupling and torque converter, a centrifugal force acts on the operation fluid in the pump due to the rotation of the pump, and the operation fluid that flows to the outer peripheral side due to the centrifugal force is permitted to flow into the turbine from the outer peripheral side thereof, thereby to drive the turbine.

Here, the friction clutch has a clutch facing that is subject to be worn out. After being used for a predetermined period of time, therefore, the friction clutch must be renewed. Besides, it is difficult to control the torque in the case of automatically controlling the clutch.

In the fluid coupling and torque converter, the pump on the drive side and the turbine on the driven side are not in mechanical contact with each other and, hence, are not subject to wearing out. However, it is not possible to freely control the transmission of torque. Besides, since the torque is not transmitted unless there is a difference in the rotational speed between the pump and the turbine, the transmission of torque becomes zero (0) when the ratio of the rotational speed of the pump to the turbine is nearly 1. When the fluid coupling and torque converter are used for a drive device of a vehicle, a drag torque is produced due to its nature in a state where the vehicle is at rest, the engine is running and a speed change gear of the transmission is in mesh, i.e., in a state where the input shaft is revolving but the output shaft is at rest. The drag torque, in general, stands for a torque that is transmitted in a state where the engine is in operation at an idling speed. The drag torque increases to a considerable degree when a design point of the fluid coupling and torque converter is set to be a rotational speed ratio at which a maximum efficiency is obtained, i.e., is set to be a rotational speed ratio of the pump to the turbine of from about 0.95 to about 0.98. When the drag torque is great, the idling operation of the engine loses stability to a conspicuous degree, and this unstable rotation becomes a cause of abnormal vibration in the drive system. Besides, a large drag torque is detrimental to the fuel efficiency during the idling operation.

SUMMARY OF THE INVENTION

It is an object of the present invention to provide a fluid clutch which is capable of easily controlling the transmission of torque and which is not so subject to being worn out.

In order to accomplish the above-mentioned object according to the present invention, there is provided a fluid clutch disposed between a first shaft and a second shaft which are arranged on the same axis, comprising:

a casing drive-coupled to said first shaft and having plural pump chambers;

a gear pump having a first pump gear which is disposed in said casing, is drive-coupled to said second shaft, and has a gear formed on the outer periphery thereof, and further having second plural pump gears which are disposed in said plural pump chambers formed in said casing and are in mesh with said first pump gear;

an intake passage that is formed in said casing and in said second shaft and that communicates with an intake port of said gear pump;

an exhaust passage that is formed in said casing and in said second shaft and that communicates with an exhaust port of said gear pump; and a control valve that is disposed in a valve hole formed in said second shaft, that communicates with said intake passage and with said exhaust passage, and that controls a communication area between said intake passage and said exhaust passage.

It is desired that said intake passage and said exhaust passage communicate with a supplementary passage, and that check valves be disposed between said supplementary passage and said intake passage and between said supplementary passage and said exhaust passage, to permit the flow of the fluid from said supplementary passage to said intake passage and to said exhaust passage.

DETAILED DESCRIPTION OF THE PREFERRED EMBODIMENTS

A preferred embodiment of the fluid clutch constituted according to the present invention will be described in further detail with reference to the accompanying drawings.

Figure 1:
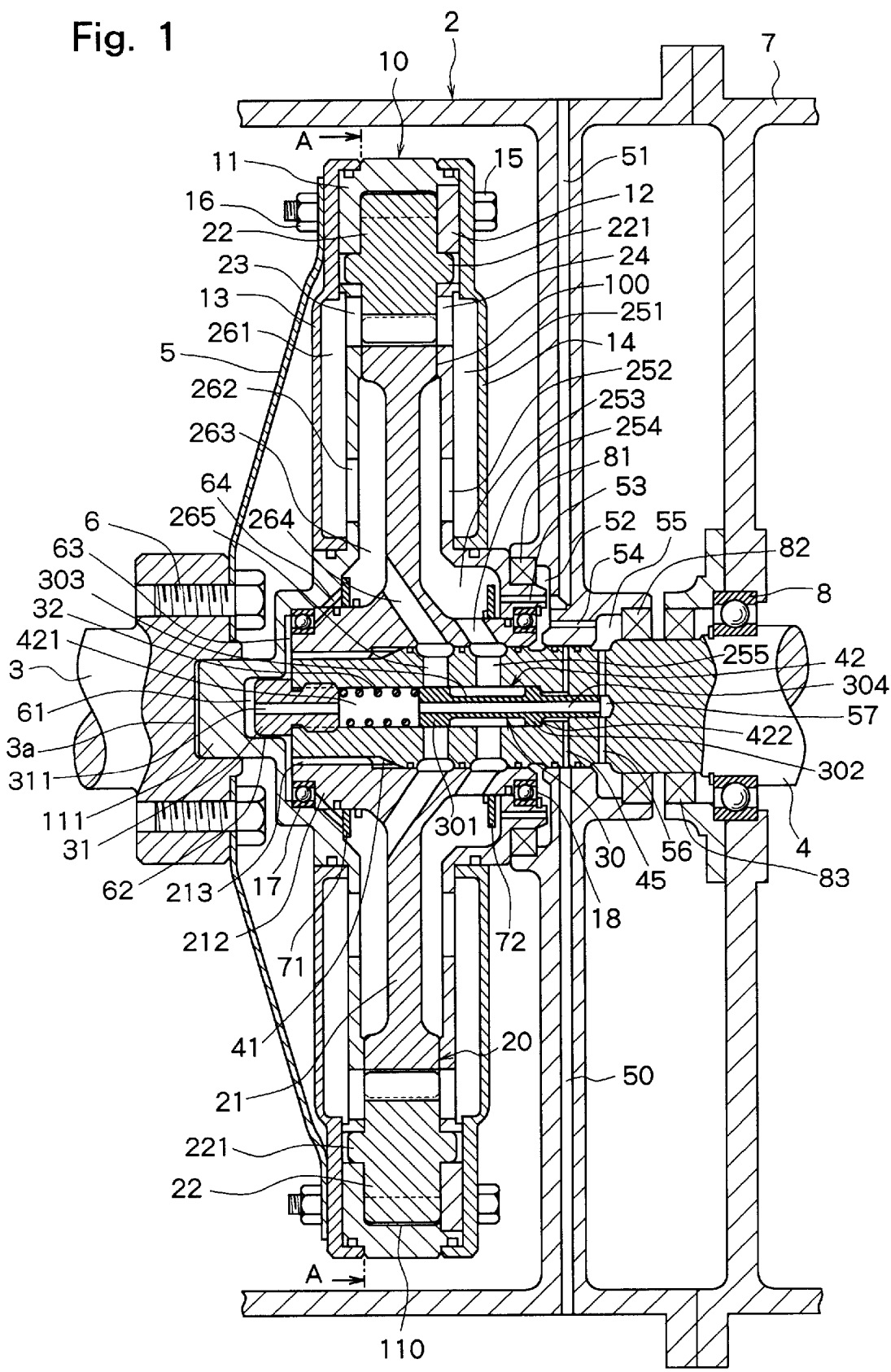
FIG. 1 is a sectional view of a fluid clutch constituted according to the present invention.
Figure 2:
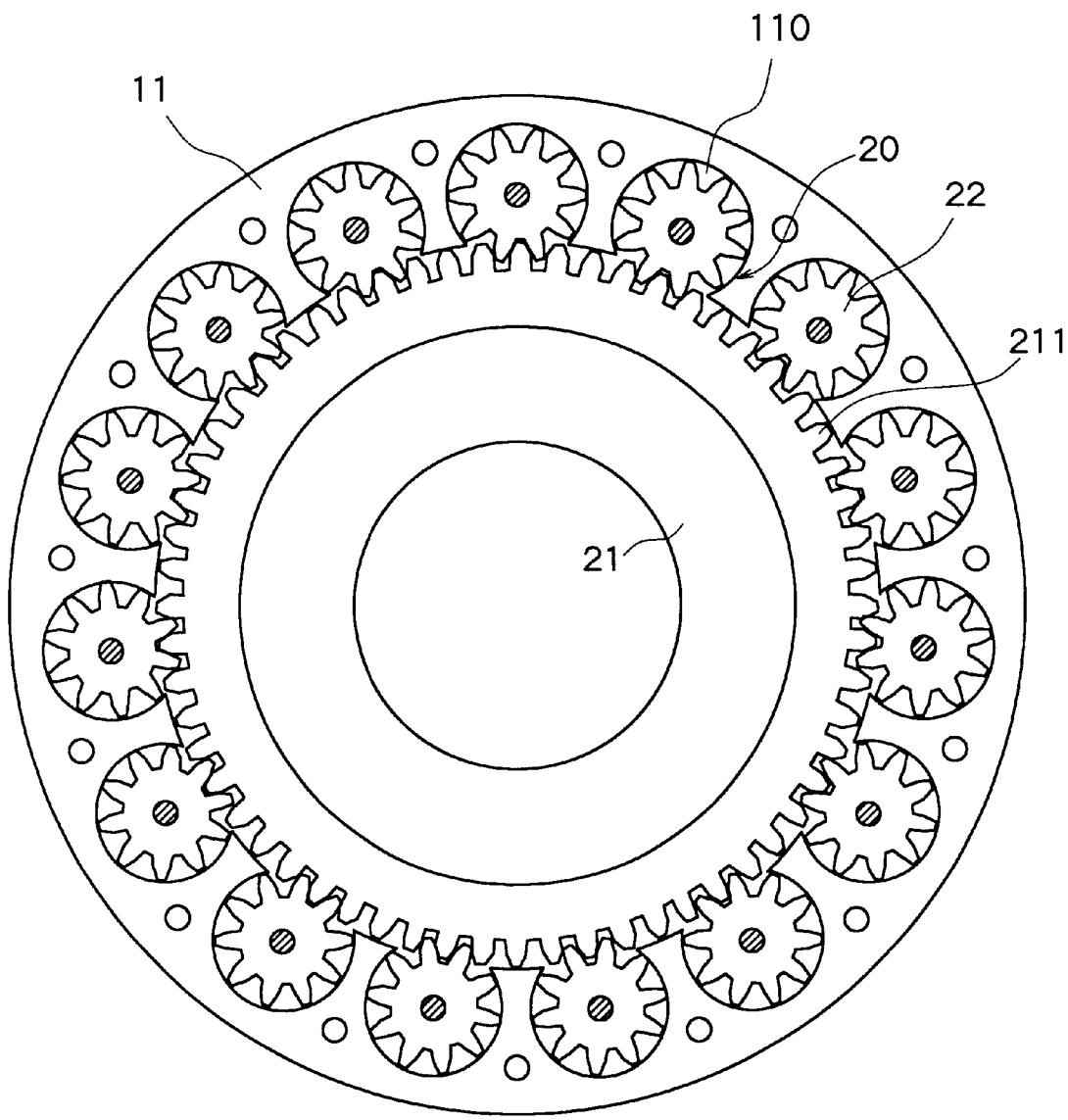
FIG. 2 is a sectional view along the line A—A in FIG. 1.

FIG. 1 is a sectional view of the fluid clutch constituted according to the present invention, and FIG. 2 is a sectional view along the line A—A in FIG. 1. The fluid clutch in the illustrated embodiment has a clutch housing 2. In the central portion of the clutch housing 2 are disposed a first shaft 3 (e.g., the crank shaft of an engine) and a second shaft 4 (e.g., the input shaft of a transmission) on the same axis. The second shaft 4 is rotatably supported by a transmission casing 7 coupled to the clutch housing 2 through a bearing 8. A coupling plate 5 is coupled at its inner peripheral portion to the first shaft 3 by bolts 6, and a casing of the fluid clutch is drive-coupled to the outer peripheral portion of the coupling plate 5. The casing 10 comprises a first casing member 11 formed like a cup, a second casing member 12 which is disposed opposite the first casing member 11 and forms an accommodation chamber 100 together with the first casing member 11, for accommodating a first pump gear 21 that will be described later, a third casing member 13 disposed on the outer side of the first casing member 11 (on the left side in FIG. 1), and a fourth casing member 14 disposed on the outer side of the second casing member 12

(on the right side in FIG. 1). These members are coupled together with the coupling plate 5 by bolts 15 and nuts 16. A support portion 111 protruding outward (toward the left in FIG. 1) is provided at the central portion of the first casing member 11, and is supported by a recessed support portion 3a formed in the input shaft 3 at the right end in FIG. 1, and is, further, rotatably supported by a boss portion 212 of the first pump gear 21 through a bearing 17. Referring to FIG. 2, plural circular pump chambers 110 are formed in the first casing member 11 on the outer side of the accommodation chamber 100, the plural circular pump chambers 110 being partly opened to the accommodation chamber 100. The second casing member 12 is rotatably supported, at its inner periphery, by the boss portion 212 of the first pump gear 21 through the bearing 18.

The first pump gear 21 is disposed in the accommodation chamber 100 formed in the casing 10. The first pump gear 21 has a gear 211 formed along the outer periphery thereof, and has an internal gear spline 213 formed in the inner periphery of the boss portion 212 thereof, the internal gear spline 213 being in spline-mesh with the external gear spline 41 formed on the second shaft 4. Second pump gears 22 are disposed in the plural pump chambers 110 and are in mesh with the gear 211 of the first pump gear 21. Rotary shafts 221 of the second pump gears 22 are rotatably supported by the first casing member 11 and by the second casing member 12. Thus, plural gear pumps 20 are constituted by the first pump gear 21 and the plural second pump gears 22 which are in mesh with each other.

The first casing member 11 has exhaust ports 23 for the plural gear pumps 20 constituted by the first pump gear 21 and the plural second pump gears 22 when the casing 10 is driven from the side of the first shaft 3. The exhaust ports 23 of the gear pumps 20 communicate with one another through communication passages that are not shown. On the other hand, the second casing member 12 has intake ports 24 for the plural gear pumps 20 constituted by the first pump gear 21 and the plural second pump gears 22 when the casing 10 is driven from the side of the first shaft 3. The intake ports 24, too, of the gear pumps 20 communicate with one another through communication passages that are not shown. Described below are the exhaust ports 23 and the intake ports 24 of the gear pumps 20 in a state where the casing 10 is driven from the side of the first shaft 3. Each intake port 24 communicates with the intake passage 255 formed in the second shaft 4 via an intake passage 251 formed by the second casing member 12 and the fourth casing member 14, an intake passage 252 formed in the second casing member 12, an intake passage 253 formed between the second casing member 12 and the first pump gear 21, and an intake passage 254 formed in the boss portion 212 of the first pump gear 21. On the other hand, each exhaust port 23 communicates with an exhaust passage 265 formed in the second shaft 2 via an exhaust passage 261 formed by the first casing member 11 and the third casing member 13, an exhaust passage 262 formed in the first casing member 11, an exhaust passage 263 formed between the first casing member 11 and the first pump gear 21, and an exhaust passage 264 formed in the boss portion 212 of the first pump gear 21.

Figure 3:
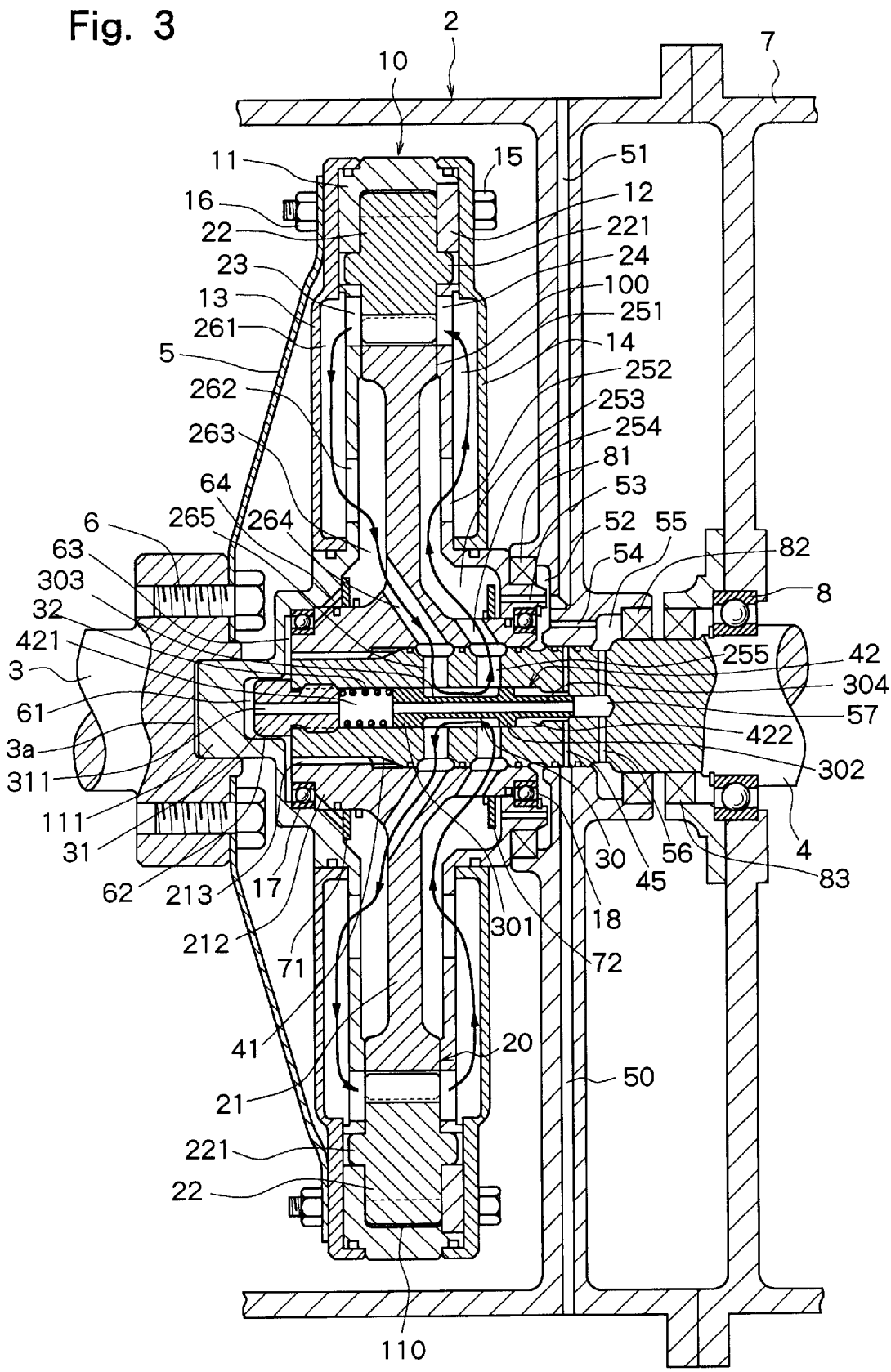
FIG. 3 is a sectional view illustrating the operating state of the fluid clutch shown in FIG. 1.

The second shaft 4 has a valve hole 42 formed in the axial central portion thereof so as to communicate with the intake passage 255 and with the exhaust passage 265. A control valve 30 is disposed in the valve hole 42 so as to slide in the axial direction. The control valve 30 comprises a first land portion 301 and a second land portion 302, both having an outer diameter corresponding to the diameter of the valve hole 42, and a shaft portion 303 having a small diameter is formed between the first land portion 301 and the second land portion 302. The outer peripheral side of the shaft portion 303, formed with a small diameter, works as a communication passage for communicating the intake passage 255 with the exhaust passage 265. The control valve 30 has a through hole 304 formed in the central portion thereof. A plug 31 having a through hole 311 is fitted to the valve hole 42 at the left end in FIG. 1, and a coil spring 32 is disposed in a chamber 421 formed between the plug 31 and the control valve 30 to urge the control valve 30 toward the right in FIG. 1 at all times. On the other hand, a chamber 422 on the right side of the second land portion 302 constituting the control valve 30 in FIG. 1, communicates with a control pressure passage 50 formed in the clutch housing 2 via a communication passage 45 formed in the second shaft 4. The control pressure passage 50 communicates with a fluid pressure adjusting valve that is not shown. The controlled fluid of which the pressure is adjusted by the fluid pressure adjusting valve (not shown) is supplied to the chamber 422 through the control pressure passage 50 and the communication passage 45, and the controlled fluid pressure acts on the second land portion 302 of the control valve 30, so that the control valve 30 slides toward the left in FIG. 1, overcoming the resilient force of the coil spring 32. As a result, the control valve 30 is located between a first position, where the first land portion 301 completely closes the exhaust passage 265 formed in the second shaft 4 as shown in FIG. 1 in compliance with the pressure of the controlled fluid, and a second position, where the exhaust passage 265 is completely opened as shown in FIG. 3, thereby to control the opening area of the exhaust passage 265. Thus, the control valve 30 has a function of controlling the communication area between the intake passage 255 and the exhaust passage 265.

The fluid clutch according to the illustrated embodiment has a supplementary passage 51 formed in the clutch housing 2. The supplementary passage 51 is connected, at its one end, to a reservoir tank that is not shown, and is coupled, at its other end, to a chamber 52 formed between the clutch housing 2 and the second casing member 12. The chamber 52 communicates, through a communication passage 53 formed in the second casing member 12, with the intake passage 253 formed between the second casing member 12 and the first pump gear 21. The chamber 52 further communicates, through a communication passage 54 formed in the clutch housing 2, with a chamber 55 formed between the clutch housing 2 and the second shaft 4. The chamber 55 communicates, through a communication passage 56 formed in the second shaft 4, with a chamber 57 that is formed in the second shaft 4 and accommodates the right end of the control valve 30 in FIG. 1.

The through hole 311, formed in the plug 31 fitted to the valve hole 42 at the left end in FIG. 1, communicates with a chamber 61 formed between the second shaft 4 and the casing member 11. The chamber 61 communicates with a chamber 63 formed between the first casing member 11 and the boss portion 212 of the first pump gear 21 through a gap 62 between the outer periphery of the plug 31 and the first casing member 11. The chamber 63 communicates with the exhaust passage 263 formed between the first casing member 11 and the first pump gear 21 through a communication passage 64 formed in the bearing 17 and the first casing member 11. Therefore, the supplementary passage 51 communicates with the intake passage 253 formed between the second casing member 12 and the first pump gear 21 through the chamber 52 and communication passage 53, and further communicates with the exhaust passage 263 formed between the first casing member 11 and the first pump gear 21 through the chamber 52, communication passage 54, chamber 55, communication passage 56, chamber 57, through hole 304 formed in the control valve 30, chamber 421, through hole 311 formed in the plug 31, chamber 61, gap 62 between the outer periphery of the plug 31 and the first casing member 11, chamber 63, bearing 17 and communication passage 64. Therefore, the above communication passages and the chambers work as supplementary passages in communication with the intake passage 253 and with the exhaust passage 263.

A first ring-like check valve 71 is disposed between the communication passage 64 and the exhaust passage 263 that is formed between the first casing member 11 and the first pump gear 21. The first check valve 71 is closed when the fluid pressure in the exhaust passage 263 is higher than the fluid pressure in the communication passage 64, i.e., in the supplementary passage, and is opened when the fluid pressure in the exhaust passage 263 becomes lower than the fluid pressure in the communication passage 64, i.e., in the supplementary passage. Accordingly, the first check valve 71 works to permit the flow of the operation fluid from the supplementary passage to the exhaust passage. Further, a second ring-like check valve 72 is disposed between the communication passage 53 and the intake passage 253 that is formed between the second casing member 12 and the first pump gear 21. The second check valve 72 is closed when the fluid pressure in the intake passage 253 is higher than the fluid pressure in the communication passage 53, i.e., in the supplementary passage, and is opened when the fluid pressure in the intake passage 253 becomes lower than the fluid pressure in the communication passage 53, i.e., in the supplementary passage. Therefore, the second check valve 72 works to permit the flow of the operation fluid from the supplementary passage to the intake passage.

In FIG. 1, reference numeral 81 denotes a seal disposed between the first casing member 11 and the clutch housing 2, reference numeral 82 denotes a seal disposed between the second shaft 4 and the clutch housing 2, and reference numeral 83 denotes a seal disposed between the second shaft 4 and the transmission casing 7.

The fluid clutch according to the illustrated embodiment is constituted as described above. Now, described below is its operation.

In a state where the control valve 30 is brought to the first position where the exhaust passage 265 is completely closed as shown in FIG. 1, the fluid circuit constituted by the exhaust passage and the intake passage is closed. When the casing 10 is driven from the side of the first shaft 3 in this state, the pressure decreases in the gear pumps 20 on the side of the intake port 24. As the pressure decreases in the intake passage 253, however, the second check valve 72 is opened and the fluid flows in through the supplementary passage and hence, no negative pressure is produced. The pressure, on the other hand, increases in the gear pumps 20 on the side of the exhaust port 23. In this state, the load of the gear pumps 20 becomes greatest, and the torque that is transmitted becomes the maximum.

Next, in a state where the control valve 30 is brought to the second position where the exhaust passage 265 is completely opened as shown in FIG. 3, the exhaust passage 265 is completely in communication with the intake passage 255 and, hence, the pressure does not increase much on the side of the exhaust port 23, the gear pumps 20 bear a small load, and the torque that is transmitted becomes a minimum. In the fluid dutch of the illustrated embodiment as described above, the position of the control valve 30 in the axial direction is controlled, thereby to control the opening area of the exhaust passage 265 in order to arbitrarily control the torque that is transmitted from a maximum as shown in FIG. 1 to a minimum as shown in FIG. 3. In the fluid clutch of the illustrated embodiment, further, the control valve 30 is disposed in the axial central portion of the second shaft 4. It is, therefore, allowed to increase the flow rate of the fluid that flows through the control valve 30 and, hence, to increase the range of torque that is transmitted.

In the foregoing was described the state where the casing 10 was driven from the side of the first shaft 3, i.e., the state where the gear pumps 20 were driven from the side of the first shaft 3. When the gear pumps 20 are driven from the side of the second shaft 4, the relationship among the exhaust port, exhaust passage, intake port and intake passage is reversed.

Being constituted as described above, the fluid clutch of the present invention exhibits action and effect as described below.

That is, the fluid clutch according to the present invention controls the communication area between the intake passage of the gear pump and the exhaust passage by a control valve to easily control the torque that is transmitted. Besides, the fluid clutch of the invention has no friction member and hence, the clutch part is not worn out.

What is claimed is:

1. A fluid clutch for coupling a first shaft and a second shaft which are arranged on the same axis, said fluid clutch comprising:

a casing drive-coupled to said first shaft and having a plurality of pump chambers;

a gear pump including a first pump gear disposed in said casing, drive-coupled to said second shaft, and having a gear formed on the outer periphery thereof, and a plurality of second pump gears disposed in said plurality of pump chambers and in mesh with said first pump gear, wherein:

an intake passage is formed in said casing and in said second shaft and communicates with an intake port of said gear pump;

an exhaust passage is formed in said casing and in said second shaft and communicates with an exhaust port of said gear pump;

a supplementary passage communicates said intake passage and said exhaust passage; and said fluid clutch further comprises a control valve disposed in a valve hole formed in said second shaft said valve hole communicating with said intake passage and with said exhaust passage to control a communication area between said intake passage and said exhaust passage, and check valves disposed between said supplementary passage and said intake passage and between said supplementary passage and said exhaust passage, to permit the flow of fluid from said supplementary passage to said intake passage and to said exhaust passage.

* * * * *